United States Patent

[11] 3,556,022

| [72] | Inventor | Sven Birger Westin |
| | | Skarsgatan 74, Goteborg, Sweden |
| [21] | Appl. No. | 741,309 |
| [22] | Filed | July 1, 1968 |
| [45] | Patented | Jan. 19, 1971 |

[54] MOLDING AND PACKAGING CANDY
7 Claims, No Drawings

[52] U.S. Cl. .................................................. 107/54,
107/8
[51] Int. Cl. .................................................. A23g 1/20
[50] Field of Search .......................................... 18/5, 34,
39; 264/250, 275, 197, 90; 53/38; 107/8.4, 54

[56] References Cited
UNITED STATES PATENTS
2,081,777  5/1937  Talalay .......................... 264/90

FOREIGN PATENTS
445,530  6/1912  France .......................... 107/8.4

*Primary Examiner*—Laverne D. Geiger
*Assistant Examiner*—Robert I. Smith
*Attorney*—Holman and Stern ABSTRACT: Confectionery articles, for example, chocolate, are moulded in an open mould consisting of recesses in a sheet, provided with at least one folding line. In the simplest form one line extends transversely across the sheet and the recesses are arranged symmetrically on either sides thereof. Each recess corresponds to one half of the finished article and the recesses in one part of the sheet are filled first and permitted to set, at least partially. Thereafter the recesses in the other part of the sheet are filled and the first part is swung 180° to make the fillings therein rest upon the fillings in the other part of the sheet. When the confectionery material has set the two halves of each article are bonded together.

MOLDING AND PACKAGING CANDY

This invention relates to a method for molding confectionery articles in at least two parts, such as chocolate figures or the like, where the molding occurs in mold halves, which are open upwards, and consist of recesses in a sheet, preferably of plastic material. Mold sheets of varying forms can be used for carrying out the method. The sheets may consist of continuous strips of a foil of transparent synthetic resin.

One object of the present invention is to provide an improved method for manufacturing and packing confectionery articles, whereby such articles may be made inexpensively.

According to the present invention the method is characterized in that the mold sheet is provided with at least one longitudinally or laterally extending folding line and that the mold sheet, after the above mentioned recesses having been filled with confectionery material, is folded along said folding line(s) in such a manner that the filled recesses pertaining to the upper part of the article being made in an adjacent part. When the fillings in the recesses set they become bonded together and form a series of two part molded articles, which are contained in a package consisting of said mold material. In order to close the package the edges of the parts of the mold sheets may be welded together.

According to one convenient mode of said method the mold sheet is provided with a folding line extending laterally across the breadth of said sheet to divide the same into two halves having matching recesses. The recesses in one of the halves are first filled with confectionery material, whereafter, just before the folding of the sheet, the recesses in the adjacent half of the sheet are filled. In this case the first filled sheet half is turned 180° towards the corresponding lastly filled sheet half, which part during the folding is maintained in the horizontal position. The material in the latter filled recesses has not set completely, when the first half is pressed down thereon, whereby the two halves of a confectionery article will be bonded together.

The mold sheet may be provided with longitudinal folding lines preferably centrally arranged in the longitudinal direction. In this case the mold recesses are arranged symmetrically on both sides of the folding line. The mold sheet may also be provided with two longitudinal folding lines whereby the lines are arranged along each longitudinal border of the sheet, a distance from the sheet edge corresponding to one-fourth of the total width of the sheet. In this modification the mold recesses are also arranged symmetrically on both sides of each of the folding lines.

The sheet may also be provided with an uneven number of longitudinal folding lines, in which case they are evenly distributed over the width of the sheets, and the folding lines are positioned a distance from each other and from the edges of the sheet corresponding to the total width of the sheet divided by the number of folding lines +1. In this case the mold recesses must be arranged symmetrically in those sheet parts that are divided by the folding lines and which parts, after the folding, will cooperate with each other to form the article.

The folding lines may, according to a suitable modification, consist of perforations, and at least one such perforated line may in this case be arranged to cooperate with a gearwheel or the like, to feed the mold forward.

However, if a method is chosen, according to which the mold sheet is provided with laterally extending folding lines, the lines should be evenly distributed over the length of the sheet, and the recesses should furthermore be arranged symmetrically on both sides of each of the folding lines. In this modification, the possibility that the confectionery material will flow out of the mold recesses during the folding of the sheet parts is eliminated. This is accomplished by the fact that every second sheet part is in turn filled with confectionery material during stepwise movement of the sheet along a conveyor. The confectionery material is allowed to set and just before folding together the remaining sheet parts are filled with confectionery material. The folding together is performed so that the sheet part which contains the almost set confectionery material, is swung 180° with its upper side against the just filled sheet part, the latter being retained in the horizontal position. This method is preferable during molding of confectionery material that is difficult to mold. After completing the molding, folding, and edge welding, the articles are cut out of the sheet parts in suitable bars or separate pieces.

Although the invention has been described and illustrated in detail, it is to be understood that this does not delimit the invention. The spirit and scope of this invention is limited only by the language of the appended claims.

I claim:

1. A method of making confectionery articles in at least two parts bonded together comprising the steps of providing a sheet of plastic material having a plurality of recesses formed therein and symmetrically spaced on each side of at least one folding line to form first and second recesses; filling the first recesses with fluid settable confectionery material; permitting the material to at least partially set; filling the second recesses with fluid settable confectionery material; folding the first recesses including the at least partially set material 180° about the folding line to respectively position the at least partially set material on top of the settable material before said settable material sets to bond said at least partially set and settable materials to each other.

2. A method as claimed in claim 1 wherein the sheet of plastic material is advanced in stepwise fashion to alternately fill the first and second recesses and has at least one folding line arranged transversely to the direction of advance.

3. A method as claimed in claim 1 wherein the sheet is advanced in stepwise fashion to fill the first and second recesses and the plastic material has at least one folding line arranged longitudinally the direction of advance.

4. A method as claimed in claim 3 wherein the sheet has two longitudinal folding lines respectively positioned one-quarter of the total width from each longitudinal edge, and two confectionery articles are formed from each transverse row of recesses.

5. A method as claimed in claim 3 wherein the sheet has an uneven number of longitudinal folding lines evenly spaced across the width of the sheet.

6. A method as claimed in claim 1 wherein the folding line is perforated.

7. A method as claimed in claim 1 including the further steps of severing the sheets about each confectionery article and welding them together to contain said article.